Aug. 1, 1944.    H. F. DOLL    2,354,854
ELECTRIC CLUTCH AND BRAKE MECHANISM
Filed Aug. 15, 1942    3 Sheets-Sheet 1
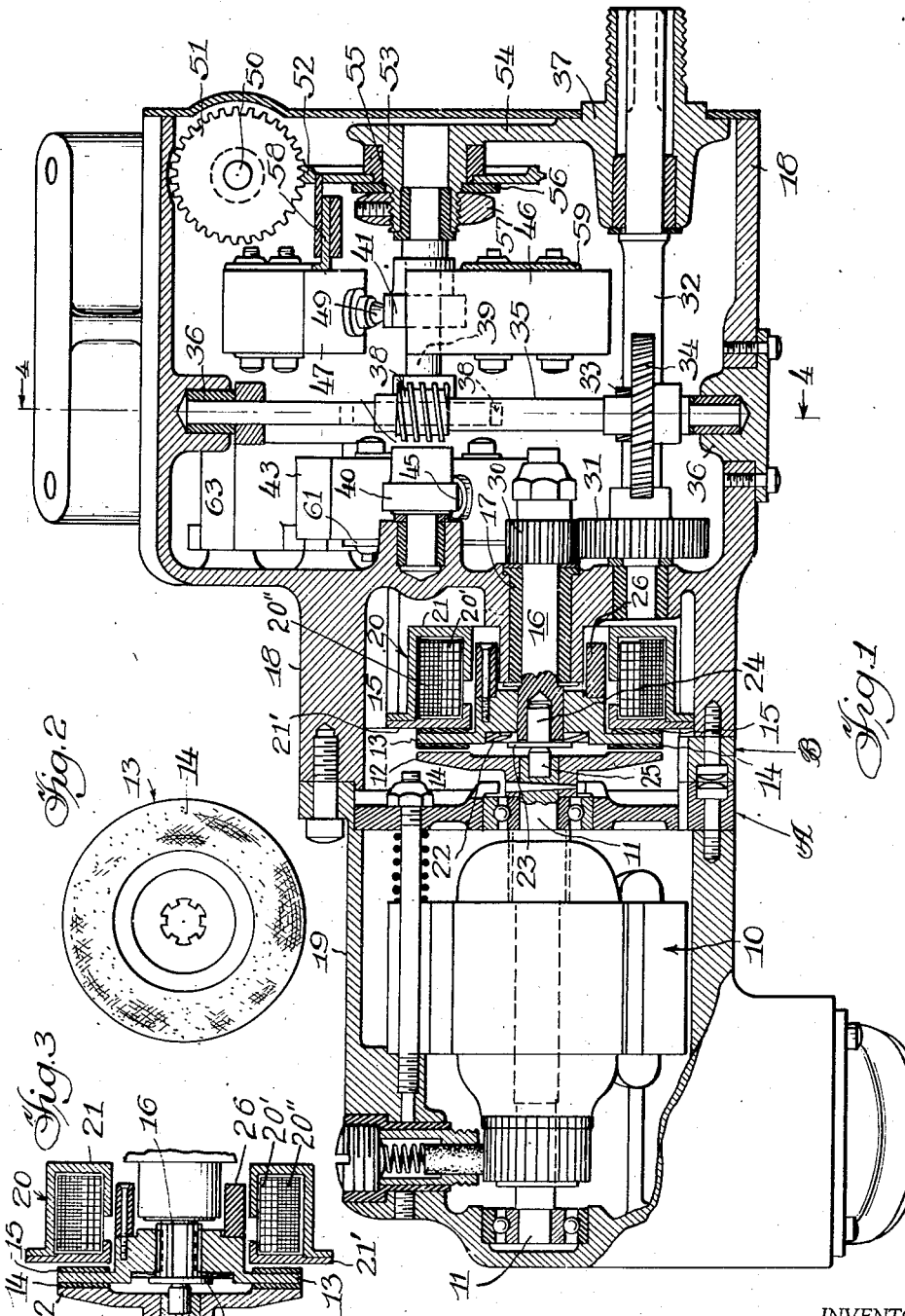
INVENTOR.
Howard F. Doll
BY
Chritton, Wiles, Davies & Hirsch, Attys.
Witness:

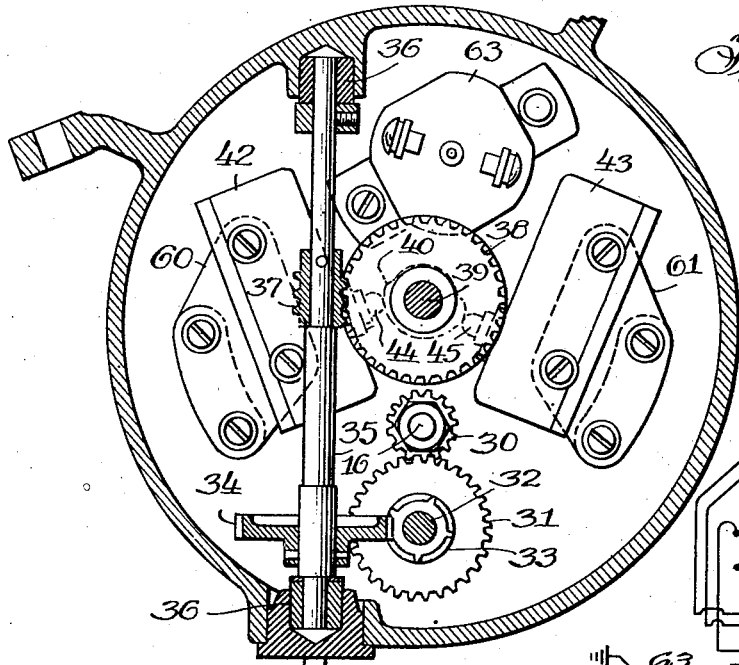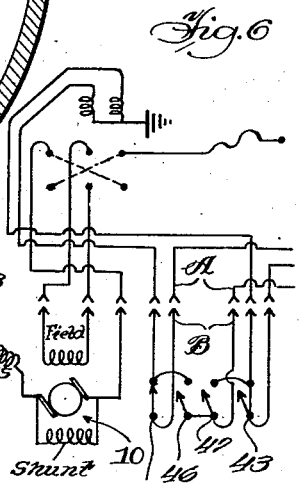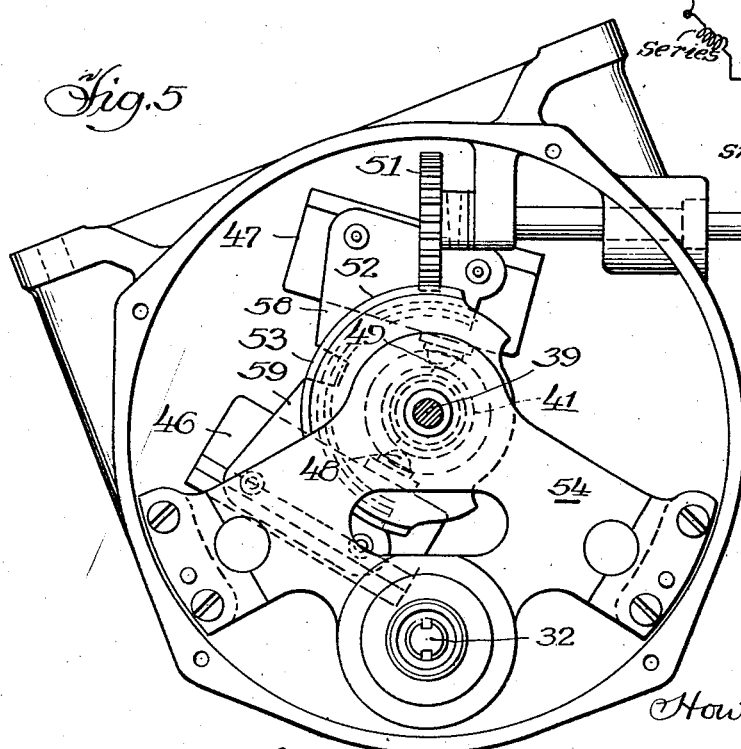

Aug. 1, 1944.                H. F. DOLL                    2,354,854
              ELECTRIC CLUTCH AND BRAKE MECHANISM
                  Filed Aug. 15, 1942          3 Sheets-Sheet 3

INVENTOR.
Howard F. Doll
BY Critton, Wiles, Davies & Hirsell, Attys.

Witness:
Chas. R. Koursh

Patented Aug. 1, 1944

2,354,854

UNITED STATES PATENT OFFICE 2,354,854

ELECTRIC CLUTCH AND BRAKE MECHANISM

Howard F. Doll, Racine, Wis., assignor to The Dumore Company, a corporation of Wisconsin Application August 15, 1942, Serial No. 454,904

9 Claims. (Cl. 192—18)

My invention relates to improvements in electric clutch and brake mechanisms. The embodiment of the invention illustrated is adapted particularly to control the opening and closing of the cowl flaps of an airplane engine.

One object of the invention is to provide a motor driven clutch mechanism in which the driven member of the clutch has a braking action applied to it immediately upon the separation of the clutch members to prevent over-running of the mechanism driven by the clutch.

Another object is to provide a clutch mechanism in which the clutch members are moved into engagement by an electromagnet connected to the driving motor, so that the clutch operates automatically when the motor starts and stops.

An additional object is to provide a clutch mechanism of this construction in which the armature in effect is splined to the shaft so that the clutch plate may operate without any movement of the output shaft.

Another object is to provide an electromagnet for this purpose in which a series or current coil is used to pull the armature into operative position in starting and to hold the same under heavy loads, and in which a potential or shunt coil is used to hold the clutch armature at light loads and at no loads.

Another object is to provide a clutch of this character in which the driven plate is made of non-magnetic material to prevent magnetic leakage to the shaft and resulting locking of the armature to the shaft.

A further object is to provide a device of this type in which the driven member of the clutch comprises two parts, i. e. a non-magnetic clutch face secured to a ring of magnetic material.

Other objects and advantages will appear from the description hereinafter given of two forms of the invention.

In the drawings:

Fig. 1 is a longitudinal, sectional elevation of one embodiment of the invention;

Fig. 2 is an elecation of the driven clutch plate;

Fig. 3 is a sectional elevation of the clutch members when in engagement;

Fig. 4 is a section on the line 4—4 of Fig. 1;

Fig. 5 is an end view with the cover plate removed;

Fig. 8 is a section thereof on the line 8—8 of Fig. 7.

Figure 6:
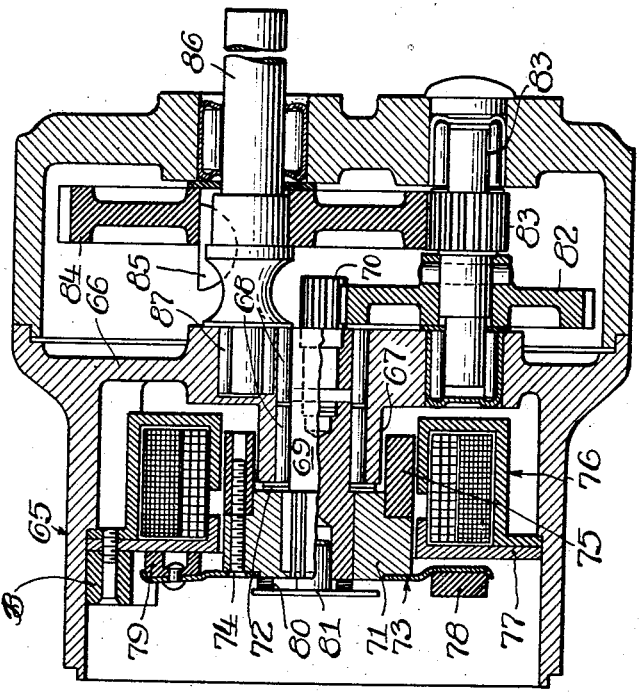
Fig. 6 is a circuit diagram.

The motor 10 may be of any suitable type, preferably a three-lead reversible motor having an armature shaft 11 to which the clutch plate 12 is fixed so as to rotate therewith. The driven clutch plate 13 is made preferably of non-magnetic material such as brass, with a facing 14, 15, of a friction material on opposite sides thereof. It is mounted on and splined to a shaft 16 (Fig. 3), aligned with the motor shaft, so as to have a slight movement back and forth on said shaft 16. Said shaft is mounted in an anti-friction sleeve 17 supported in an opening in a transverse wall in the casting 18, which casting comprises the housing for the clutch and the gear mechanism hereinafter described. The motor housing 19 is bolted to said casting so as to be readily detachable therefrom.

In order to move the clutch plate 13 into frictional engagement with the driving plate 12, i. e. to the left as viewed in Fig. 1, an electromagnet 20 is provided comprising concentrically mounted series and shunt coils 20' and 20''. These electromagnetic windings are mounted in a frame or container made of separable steel parts 21, 21'. The part 21' of the frame which faces the driven clutch plate 13 constitutes a back plate or stationary brake member against which said driven plate is normally held in frictional engagement by means of a spring washer 22 or other resilient member. Said spring washer is confined by the head 23 of the stud 24 which is secured in the end of the shaft 16. This part, known also as a thrust plug, may be made to fit over the end of the spline shaft instead of in a recess therein. It is made of hardened steel and engages a small thrust block 25 in the adjacent end of the armature shaft, this block being self-lubricating.

The hub of the non-magnetic driven plate 13 has a shoulder on which is mounted a ring 26 of magnetic material. Said ring constitutes the armature of the electromagnet 20 and when the latter is energized it tends to move to the left, as shown in Fig. 1, and thus release the driven plate 13 from frictional engagement with the stationary back plate 21' and press it against the rotatable driving plate 12. The use of non-magnetic material such as brass or bronze is desirable not only as an anti-friction material, slidable on the spline, but because said non-magnetic material prevents magnetic leakage to the shaft and the resulting locking of the armature to the shaft.

The operation of the clutch and brake will now be described:

The inner coil of the electromagnet is connected in series with the motor and since the current input to the motor is rather high when the motor circuit is closed, said coil is highly energized and produces a strong pull on the armature, thereby moving the clutch plate 13 into firm frictional engagement with the rotating or driving clutch plate 12. As the motor speed increases, the current in the series coil drops off, resulting in a decrease in its energization. The outer coil or potential coil is connected across the brushes of the motor and hence is in shunt with the armature so that on starting, this coil has very little voltage across it and is energized only slightly.

However, as the potential across the armature increases with the increasing speed, there is a greater flow of current in the outer coil and thus the clutch is maintained in operative position while the motor is running. In other words, the potential or shunt coil is used to hold the clutch armature at light loads and no loads and the series or current coil is relied on to pull the armature into operative position on starting and hold the same under heavy loads and stall conditions. Said armature, through its mounting on the hub of the driven clutch plate, is slideable indirectly on the spline of the shaft 16. This allows the clutch plate to operate initially without imparting movement to the output shaft.

When the circuit is opened and the electromagnet windings are deenergized, the spring washer 22 immediately moves the rotatably driven clutch plate 13 away from the rotating driving plate 12. Due to the inertia of said plate, however, and of the gear train connected to the driven shaft, these parts would continue to rotate except for the provision of braking means. The desired braking action becomes effective immediately in that the driven plate 13 with its frictional facing is instantaneously forced against the non-rotatable frame 21' of the electromagnet, thus preventing any overrunning of the parts.

The clutch shaft 16, which for some purposes may be considered an output shaft, drives additional mechanism as follows:

The pinion 30 on said shaft engages gear 31 on shaft 32 which has a worm 33 on it engaging a gear 34 on a countershaft 35 mounted in bearings 36. The shaft 32 has a spline on its outer end to receive a power-delivering device, as for example a flexible shaft to open and close the cowl flaps of an airplane engine. Said shaft has a bearing in the adapter 37.

The countershaft 35, by means of a worm and gear 38, drives the camshaft 39 on which are two cams 40 and 41. Cam 40 controls the safety switches 42 and 43 (which are standard microswitches), by engaging two push buttons 44 and 45 respectively, while cam 41 controls the selective switches 46 and 47 through push buttons 48 and 49 respectively. Each cam thus operates two standard micro-switches alternately. The cams are effective only for a short part of the complete rotation.

The pilot controls the opening or closing of the cowl flaps of the airplane engine from the cockpit and determines the amount of opening or closing by operating an instrument (not shown) which is connected to the control shaft 50 (see Fig. 5). Said shaft has a pinion 51 thereon which engages with a segment gear 52 that is supported by part of the limit switch bracket 53. Said bracket comprises the following:

Switch hanger 54 (Fig. 1); segment gear 52; bracket hub 55; washer 56 and nut 57. These parts operate as a unit, and on this bracket is mounted one switch mounting plate 58 and another switch mounting plate 59.

The selective switch 46 is mounted on said plate 59 and held in correct position with respect to cam 41. Selective switch 47 is mounted on switch mounting plate 58 and held in correct position with respect to said cam 41.

The safety switch plate 60 carries switch 42 and is held in correct position with respect to safety cam 40. Safety switch plate 61 (shown also in Fig. 1) carries safety switch 43 and is also held in correct position with respect to safety cam 40.

When the pilot revolves the limit switch bracket 53, which carries selective switches 46 and 47, the latter are moved in a clockwise direction as viewed in Fig. 5, and the cam follower (which is a part of the switch) leaves the cam lobe, which permits the switch 47 to close the electric circuit that connects the electric motor. The motor revolves the gear train in the correct direction to open the cowl flaps. The camshaft revolves until the lobe of the cam 41 engages the cam follower 49, thereby breaking the electric circuit.

When the selective switches 46 and 47 are moved in a counter-clockwise direction, the mechanism will close the cowl flaps to the amount selected by the pilot of the plane.

The safety switches 42 and 43 are situated so as to act to break the electric circuit should the cam 41 fail to break the circuit through the selective switches.

It will be seen that the mechanism described enables the pilot to hold open the cowl flaps as long as he desires and to close them at will. When he wishes to close the cowl he energizes the opposite switch by a motor-reversing relay, shown in the diagram in Fig. 6, and the motor begins to run and continues operating until it actuates the opposite switch. The same reference characters, wherever applicable, have been applied to corresponding parts in this Fig. 6 diagram. The two groups of separable contact members for closing the circuits when the parts are assembled, are marked A and B as a whole and are indicated also near the lower part of Fig. 1.

The thermostat 63 is connected in series with the motor to prevent overloading the motor and burning it out.

It is obvious that the motor, with its clutch mechanism, may be manufactured and sold with or without the gear unit.

Figure 7:
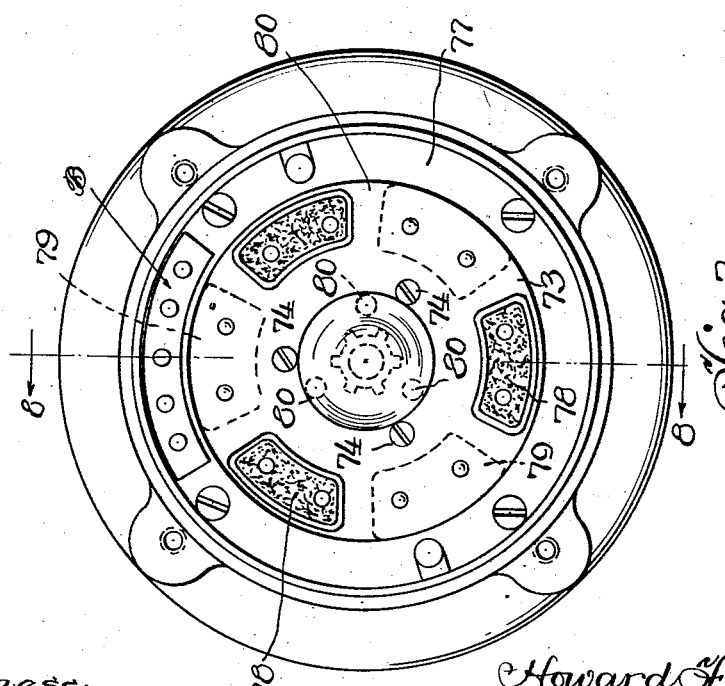
Fig. 7 is an end view of a modified form of clutch mechanism.

In Figs. 7 and 8 I have illustrated a modified form of the invention representing a later development and constituting the preferred form thereof.

In Fig. 8 the motor housing has been detached from the clutch housing, the latter comprising a casing 65 with an end wall 66 having a hub or bearing 67. Within the opening in said hub are mounted needle bearings 68 which support the rotatable shaft 69, the latter having a pinion 70 at one end. A hub 71 for the driven clutch plate is mounted on the other end of said shaft having a splined connection therewith, permitting limited back and forth movement. The inner end of said hub bears against a thrust washer 72.

The driven clutch plate 73 and its supporting hub are made preferably of non-magnetic material such as brass or bronze, as in the form of the invention previously described. It is secured to the hub by suitable means such as screws 74 which serve also to hold in place the steel ring 75 which serves as the armature. Said armature is positioned somewhat to the right of the air gap formed by the magnet frame which latter has a main portion or housing 76 and a cover plate 77. Concentrically arranged series and shunt coils are mounted within this magnet frame and operate in the manner previously described. When the magnet is energized the armature 75 moves a little to the left thereby moving the driven clutch plate slightly to the left. Said clutch plate carries friction pads on each side, as for example three cork pads 78 riveted in place on the outside and three similar pads 79 on the inside. The outside pads are pressed against the driving plate on the motor shaft when said movement takes place. The return movement is caused by springs 80, compressed between the head of the thrust plug 81 and the hub 77 and results in frictional engagement between the inside pads 79 and the plate 77 of the magnet frame.

The second form of brake and clutch mechanism just described has been designed to reduce the inertia of the revolving parts and provide a better action. The contacting surfaces, as will be noted, are on the three-point contacts, which makes the mechanism self aligning.

It will be understood that the cowl actuating mechanism, including the various switches, may be the same as that described in connection with the first form of invention where they are used with the second form described in Figs. 7 and 8. In both cases the limit switches 60 and 61 are arranged so as to move around the circumference of the cam to provide for the correct location of the switch when in the closed position and when in the open position of the cowl flap. These two switches may be incorporated in the manual control to permit the motor to be used for cowl flaps with a shorter path of travel and at the same time the indicating handle may remain in the central position of the indicating plate.

In both forms of the invention illustrated, the driving plate or the driven plate or both may be provided with holes to allow the escape of air and thus permit the clutch to operate faster. Also, instead of the thrust plug, a ball bearing may be used in the end of the armature shaft to reduce friction. Various other changes may be made in the mechanism described without departing from the spirit of the invention.

The claims herein are directed to the electric clutch and brake mechanism and not to the control mechanism per se, which latter constitutes a separate invention.

I claim:

1. An electric clutch comprising a driving plate and a driven member, said driven member consisting of a non-magnetic disk with a magnetic ring secured thereto, an electromagnetic winding in a cylindrical housing positioned on the opposite side of said non-magnetic disk from said driving plate and having an air gap in the inner surface of said housing, offset from the middle of and surrounding said magnetic ring, which latter constitutes a floating armature tending to center itself with respect to said air gap by movement toward said driving plate, when said electromagnet is energized, thus insuring movement of said non-magnetic disk away from said magnet housing, when the winding is energized, and into frictional engagement with said driving plate.

2. An electric clutch and brake comprising an electromagnet having a housing, a driving shaft, a clutch plate secured thereto, a driven shaft, an axially movable clutch member thereon positioned between said clutch plate and housing and normally in engagement with said housing to prevent rotation, an armature movable axially with respect to said shaft under the influence of said electromagnet and serving to move said clutch member away from said housing and into engagement with said plate when said magnet is energized, said clutch member comprising non-magnetic material.

3. An electric clutch and brake comprising an electric motor having an armature shaft, a clutch plate secured thereto to rotate therewith, an electromagnetic winding arranged concentrically with respect to the axis of said shaft, a housing for said magnet, an annular armature mounted within said housing to move axially under the influence of said magnet, a non-magnetic clutch plate secured to said armature to be moved into engagement with said rotatable clutch plate, a driven shaft aligned with said armature shaft, said clutch plate being splined to said driven shaft, a headed pin in an opening in the end of said driven shaft and a spring normally compressed between the head of said pin and said clutch plate and opposed to the movement of said armature, whereby said non-magnetic plate is normally held thereby in frictional engagement with said electromagnet housing to serve as a brake.

4. The combination with a motor having a clutch plate on its armature shaft, a driven shaft alined with said armature shaft, a driven clutch plate adjacent said first plate and slidably and non-rotatably mounted on said driven shaft, an electromagnet in solenoid form having a floating armature within the same connected to said driven clutch plate to effect engagement thereof with said driving plate; and a spring on said shaft normally holding said driven plate against a stop to provide a braking action for said driven shaft, said electromagnet having concentric potential and current coils connected to said motor, said current coil serving to move the armature of said electromagnet when said motor starts and to hold the same under heavy loads, and said potential coil serving to hold said clutch plates in engagement under light loads or no load.

5. An electromagnetic clutch and brake comprising two aligned shafts each mounted to rotate and to resist axial movement, a driving plate fixed to one of said shafts, a driven plate slidably and non-rotatably mounted on the other shaft, an electromagnet having a fixed annular housing with an annular air gap around its inner surface, a floating armature within said annular housing and mounted on said driven plate in position to center itself with respect to said gap and thus to slide said driven plate axially when said electromagnet is energized, said driven plate being mounted between said driving plate and a wall of the electromagnet housing, yielding means normally holding said driven plate out of contact with said driving plate and in contact with said wall whereby the latter acts as a brake to prevent rotation, and whereby energization of said electromagnet moves said driven plate against the action of said yielding means into contact with said driving plate and out of contact with said housing.

6. An electromagnetic clutch and brake comprising two aligned shafts each mounted to rotate and to resist axial movement, a driving plate fixed to one of said shafts, a driven plate slidably and non-rotatably mounted on the other shaft, a solenoid one end of which affords a braking surface for said driven plate, and a floating core within said solenoid surrounding said other shaft and supported by said driven plate in a position off-center with respect to the air gap in said solenoid to move the latter away from said solenoid when the same is energized and into engagement with said driving plate.

7. An electromagnetic clutch and brake comprising two aligned shafts each mounted to rotate and to resist axial movement, a driving plate fixed to one of said shafts, a driven plate slidably and non-rotatably mounted on the other shaft, a solenoid one end of which affords a braking surface for said driven plate, a core within said solenoid surrounding said other shaft and mounted on said driven plate to move the latter away from said solenoid when the same is energized and into engagement with said driving plate, a thrust plug in the end of said other shaft, and a spring member confined between said plug and said driven plate to press the latter against said braking surface when said solenoid is de-energized.

8. An electromagnetic clutch and brake comprising two aligned shafts each mounted to rotate and to resist axial movement, a driving plate fixed to one of said shafts, a non-magnetic driven plate having a hub surrounding said other shaft and slidably and non-rotatably mounted thereon, a solenoid one side of which affords a braking surface for said driven plate, a ring of magnetic material within said solenoid and mounted on said hub to move said driven plate away from said solenoid when the same is de-energized and into engagement with said driving plate.

9. An electromagnetic clutch and brake as in claim 8, with the addition of friction pads on opposite sides of said driven plate to contact with said driving plate and the side of said solenoid respectively.

HOWARD F. DOLL.